United States Patent
Di Censo et al.

(10) Patent No.: US 11,548,448 B2
(45) Date of Patent: Jan. 10, 2023

(54) ACCESSORY MOUNTING FRAME FOR A VEHICLE SEAT BASE

(71) Applicant: FAURECIA AUTOMOTIVE SEATING, LLC, Auburn Hills, MI (US)

(72) Inventors: Davide Di Censo, Sunnyvale, CA (US); Cedric Ketels, Mountain View, CA (US); Thomas Dessapt, Sunnyvale, CA (US); Rodney Goodrich, Watervliet, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 307 days.

(21) Appl. No.: 16/886,291

(22) Filed: May 28, 2020

(65) Prior Publication Data
US 2021/0370842 A1 Dec. 2, 2021

(51) Int. Cl.
*B60R 11/00* (2006.01)
*B60N 3/00* (2006.01)
*B60N 3/06* (2006.01)

(52) U.S. Cl.
CPC .............. *B60R 11/00* (2013.01); *B60N 3/001* (2013.01); *B60N 3/06* (2013.01); *B60R 2011/0003* (2013.01); *B60R 2011/005* (2013.01)

(58) Field of Classification Search
CPC .............. B60R 11/00; B60R 2011/0029; B60R 2011/0042; B60R 2011/0003;
(Continued)

(56) References Cited

U.S. PATENT DOCUMENTS

| 5,326,067 | A | * | 7/1994 | Gonzalez | B60N 2/01583 |
| | | | | | 297/440.22 |
| 5,947,562 | A | * | 9/1999 | Christofferson | A61G 5/10 |
| | | | | | 297/440.22 |

(Continued)

FOREIGN PATENT DOCUMENTS

| CN | 106853802 A | * | 6/2017 |
| CN | 107539166 A | | 8/2017 |

(Continued)

OTHER PUBLICATIONS

Machine translation CN-106853802-A.*

*Primary Examiner* — D Glenn Dayoan
*Assistant Examiner* — Kevin P Weldon
(74) *Attorney, Agent, or Firm* — Reising Ethington P.C.

(57) ABSTRACT

An accessory mounting frame is attachable to various vehicle seat bases and allows for connection of a vehicle accessory when the vehicle seat is removed. The accessory mounting frame includes a first seat attachment projection, a second seat attachment projection, and an accessory fastener coupled to the first seat attachment projection and the second seat attachment projection. The first seat attachment projection has a first bearing surface that is configured to bear against a first portion of the vehicle seat base. The second seat attachment projection has a second bearing surface that is configured to bear against a second portion of the vehicle seat base. The first seat attachment projection and the second seat attachment projection are adjustable with respect to the accessory fastener.

15 Claims, 3 Drawing Sheets

(58) Field of Classification Search
CPC ...... B60R 2011/005; B60R 2011/0059; B60N 3/001; B60N 3/002; B60N 3/06
USPC .......................................... 296/75, 64, 65.03
See application file for complete search history.

(56) References Cited

U.S. PATENT DOCUMENTS

| | | | |
|---|---|---|---|
| 6,254,054 B1* | 7/2001 | Few ................... | B60N 2/01558 |
| | | | 297/336 |
| 6,364,393 B1* | 4/2002 | Shafry ............... | B60N 2/01583 |
| | | | 297/331 |
| 6,488,249 B1* | 12/2002 | Girardi ............. | B60N 2/01541 |
| | | | 296/65.14 |
| 2004/0066055 A1* | 4/2004 | Otto ................... | B60N 2/01558 |
| | | | 296/65.03 |
| 2021/0086678 A1* | 3/2021 | Enning ................. | B60N 3/001 |

FOREIGN PATENT DOCUMENTS

| | | |
|---|---|---|
| CN | 107985132 A | 5/2018 |
| CN | 108216385 A | 6/2018 |
| DE | 102015216171 A1 | 3/2017 |
| EP | 1688298 A1 | 8/2006 |
| WO | WO2018211468 A1 | 11/2018 |

\* cited by examiner

ACCESSORY MOUNTING FRAME FOR A VEHICLE SEAT BASE

TECHNICAL FIELD

The present disclosure is related generally to vehicle interiors and, more particularly, to mounting frames for attaching vehicle accessories.

BACKGROUND

For ride-hailing and ride-sharing services, it is advantageous to provide services and amenities to second-row passengers. If the front seat is removed, a vehicle accessory can be installed to provide such services and/or amenities to the second-row passengers. Given the variability in vehicle seat base arrangements, interchanging between different vehicle accessories may be challenging. EP 1688298 to Weiland discloses a mounting rail to fix a vehicle seat to its modular floor system. However, Weiland does not contemplate a universal or semi-universal accessory mounting frame that can be coupled to various vehicle seat base arrangements.

SUMMARY

An illustrative accessory mounting frame for a vehicle seat base comprises a first seat attachment projection having a first bearing surface and a second seat attachment projection having a second bearing surface. The first bearing surface is configured to bear against a first portion of the vehicle seat base, and the second bearing surface is configured to bear against a second portion of the vehicle seat base. The accessory mounting frame further comprises an accessory fastener coupled to the first seat attachment projection and the second seat attachment projection. The first seat attachment projection and the second seat attachment projection are adjustable with respect to the accessory fastener.

In various embodiments, at least a portion of each of the first bearing surface and the second bearing surface is created by a cam-shaped extremity.

In various embodiments, the first bearing surface and the second bearing surface have a concave profile.

In various embodiments, the concave profile of each of the first bearing surface and the second bearing surface at least partially defines a vehicle seat attachment range.

In various embodiments, the first seat attachment projection has a first opposite bearing surface, wherein the first opposite bearing surface is configured to bear against a first opposite portion of the vehicle seat base.

In various embodiments, the second seat attachment projection has a second opposite bearing surface, wherein the second opposite bearing surface is configured to bear against a second opposite portion of the vehicle seat base.

In various embodiments, the first seat attachment projection and the second seat attachment projection are symmetrically arranged with respect to the accessory fastener.

In various embodiments, the first seat attachment projection and the second seat attachment projection form an "X" shape having four prongs.

In various embodiments, the four prongs extend from corners of an adapter plate of the accessory fastener.

In various embodiments, a plurality of springs is used to bias the first seat attachment against the second seat attachment projection.

In various embodiments, the plurality of springs is configured to clamp the first seat attachment projection and the second seat attachment projection to the first portion of the vehicle seat base and the second portion of the vehicle seat base.

In various embodiments, the first seat attachment projection and the second seat attachment projection are rotatably mounted with respect to the accessory fastener.

In various embodiments, the accessory fastener comprises an adapter plate having one or more locating holes.

In various embodiments, the accessory fastener comprises one or more locking projections.

In one embodiment, a vehicle comprises an interior passenger cabin, a vehicle accessory, and the illustrative accessory mounting frame. The first bearing surface of the accessory mounting frame bears against the first portion of the vehicle seat base and the second bearing surface bears against the second portion of the vehicle seat base. The vehicle accessory is installed within the vehicle interior passenger cabin via the accessory fastener of the accessory mounting frame.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a universal or semi-universal accessory mounting frame having adjustable seat attachment projections that facilitate attachment to different seat mounting arrangements, while providing an accessory fastener which allows for the installation of various vehicle accessories. In some embodiments, the vehicle accessories are particularly adapted for a ride-sharing or ride-hailing service, such that the accessory can be mounted to the front passenger seat base when the seat is removed. The vehicle accessory in this embodiment can provide more usable space and opportunity in the vehicle interior passenger cabin to provide services and amenities to the second-row passengers. In another embodiment, the accessory mounting frame provides for the attachment of vehicle accessories such as storage platforms or other devices that help facilitate cargo storage for in-vehicle commerce. Thus, when the seat of a vehicle is removed, the universal accessory mounting frame embodiments described herein can allow for easy mounting and installation of various vehicle accessories.

Figure 1:
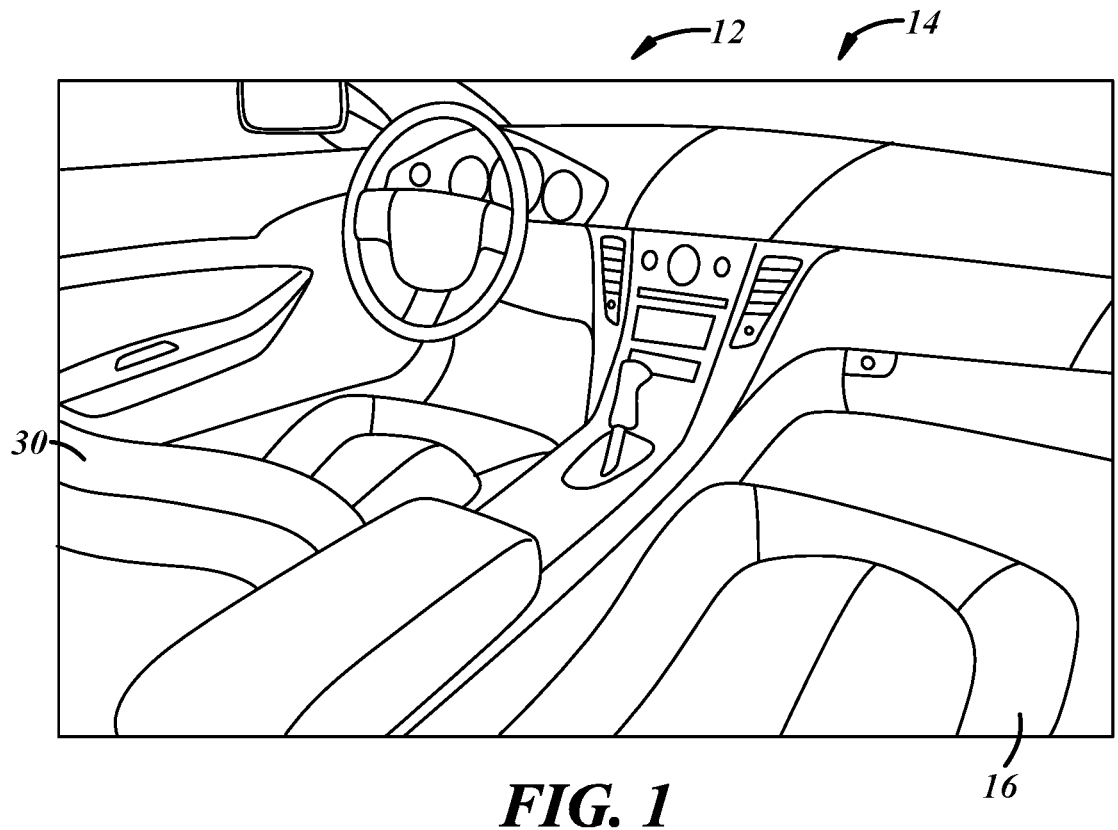
FIG. 1 is a perspective view of the interior of a vehicle passenger cabin equipped with a vehicle front passenger seat.
Figure 2:
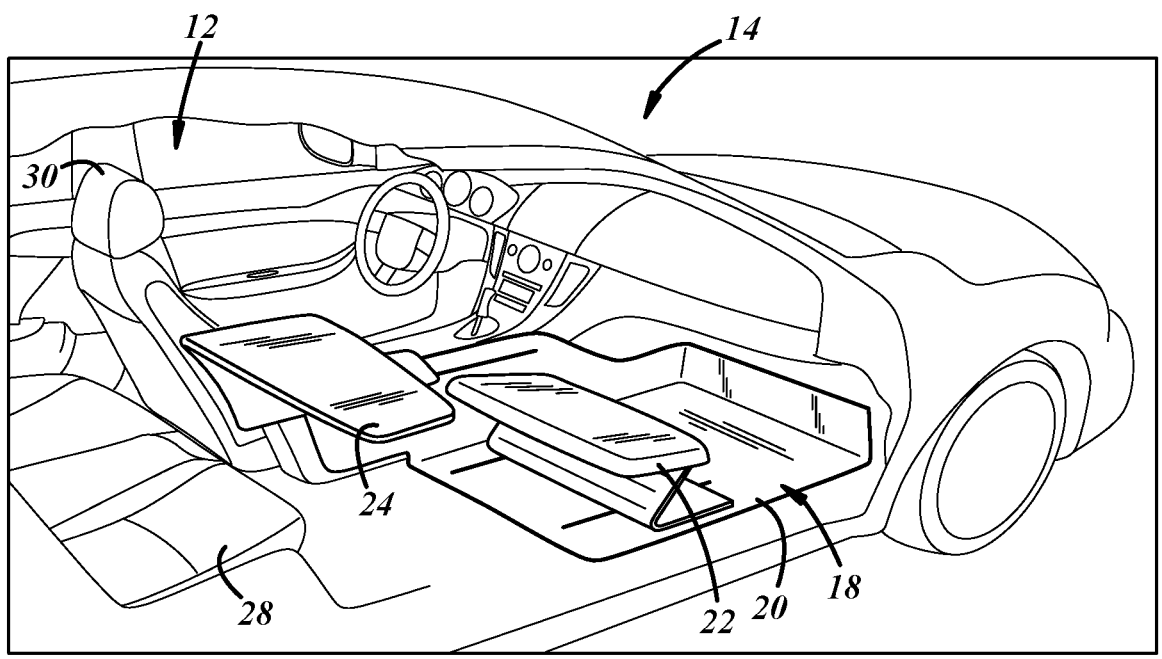
FIG. 2 is a perspective view of the interior of the vehicle passenger cabin of FIG. 1, where the vehicle front passenger seat is removed, and a ride-sharing vehicle accessory is installed in its place.
Figure 3:
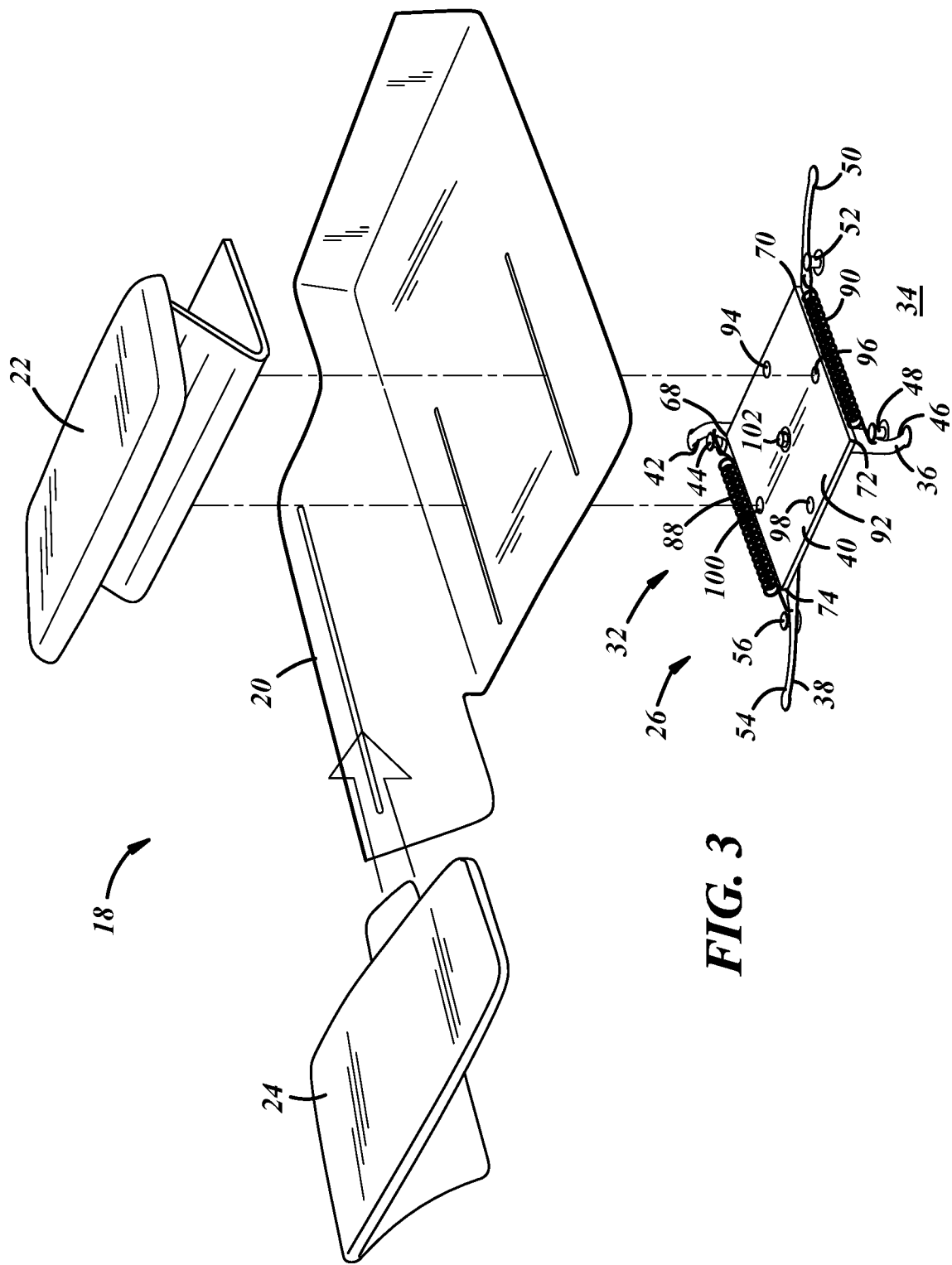
FIG. 3 is an exploded view of the ride-sharing vehicle accessory from FIG. 2 and one embodiment of an accessory mounting frame.
Figure 4:
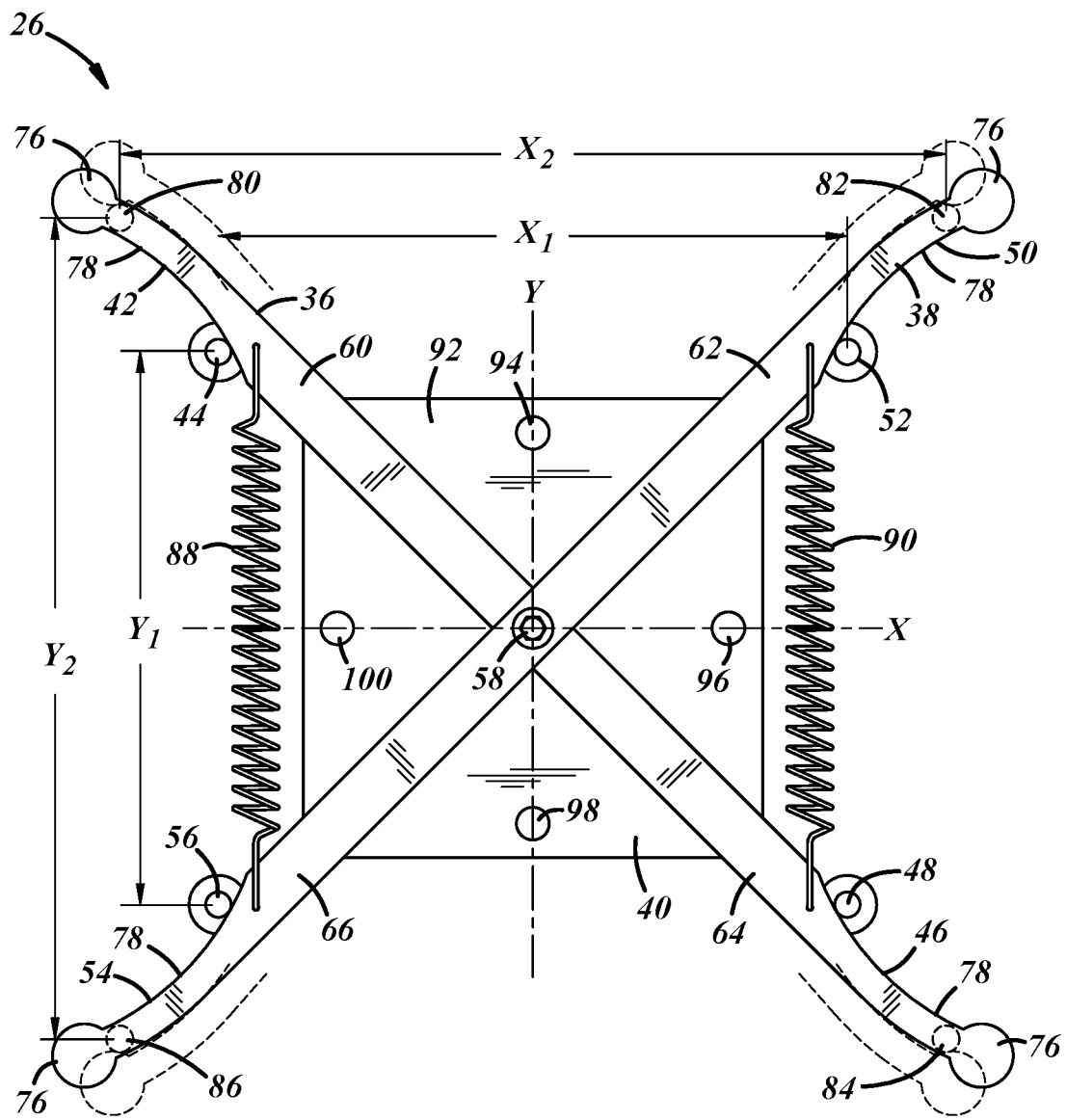
FIG. 4 is an underside view of the accessory mounting frame shown in FIG. 3.

FIGS. 1 and 2 illustrate an example interior passenger cabin 12 of a vehicle 14. In FIG. 1, the front vehicle passenger seat 16 is installed within the interior passenger cabin 12. In FIG. 2, the front vehicle passenger seat is removed and a vehicle accessory 18, such as the illustrated platform 18, footrest 20, and/or tray table 22 is installed within the interior passenger cabin 12. FIGS. 3 and 4 illustrate an accessory mounting frame 26 that can be used to mount the vehicle accessory 18 in the interior passenger cabin 12 when the vehicle seat 16 is removed. While the illustrated embodiments show operation of the accessory mounting frame 26 with respect to the front vehicle passenger seat 16, the mounting frame 26 can be used at other locations within the cabin 12 of the vehicle 14, such as when the second-row seat 28 or a third-row seat is removed, to cite a few examples. In one example embodiment, the driver's seat 30 can be removed and a vehicle accessory such as an aftermarket seat can be installed using the mounting frame 26. Other example arrangements are certainly possible for the interior passenger cabin 12 of the vehicle 14.

The vehicle accessory 18 can include any feature, service, amenity, etc. that takes advantage of the extra volume in the vehicle interior cabin 12 upon removal of one or more of the vehicle seats 16, 28, 30. For ride-sharing or ride-hailing embodiments, for example, the vehicle accessory 18 can be a ride-sharing vehicle accessory that provides services and amenities to passengers in the second-row seats 28. Some of these services and amenities include, but are not limited to, comfort functionalities (e.g., foot rest 22, additional leg room, access to thermal controls, etc.), vending services, as well as productivity and entertainment features (e.g., tray table 24, charging capabilities, display screens, etc.). In other embodiments, such as with in-vehicle commerce companies, the vehicle accessory 18 may include a platform 20 or other cargo organizational feature. A vehicle accessory of this type allows for commercial facilitation and deployment of increased cargo capacity in a multitude of different vehicle styles. The accessory mounting frame 26 detailed herein allows for mounting of a wide variety of vehicle accessories 18 into different anchor point configurations for various vehicle seat arrangements.

FIGS. 3 and 4 illustrate the accessory mounting frame 26 that can be used to facilitate mounting of a vehicle accessory 18 upon removal of a vehicle seat, such as the front vehicle passenger seat 16. FIG. 3 is an exploded view of the vehicle accessory 18 and the accessory mounting frame 26, and FIG. 4 is a rear or underside view of the mounting frame 26. The accessory mounting frame 26 allows for a service-providing platform 20 or other vehicle accessory 18 to be installed on any vehicle, creating a standard solution to universal fitting. Current vehicles have a variety of anchor point dimensions and configurations. An interface mechanism can create a universal or semi-universal solution that would fit most vehicles and anchor points. The accessory mounting frame 26 acts as the interface mechanism to resize and/or reshape the interface 32 at the vehicle seat base 34. The accessory mounting frame 26 is adjustable so as to fit with the specific vehicle's seat anchor points, and provide mounting capability for one or more vehicle accessories 18.

The accessory mounting frame 26 includes a first seat attachment projection 36, a second seat attachment projection 38, and an accessory fastener 40. These components of the accessory mounting frame 26 can be manufactured from any operable material, such as metal or plastic. In one embodiment, the mounting frame 26 is made from aluminum or an aluminum alloy, which can be lighter and more user friendly than other metallic materials. In another embodiment, the mounting frame 26 is made from reinforced plastic. If using reinforced plastic, it may be advantageous to include ribs, grooves, or a corrugated structure to help impart more structural rigidity to the frame 26.

The first seat attachment projection 36 and the second seat attachment projection 38 serve to couple the accessory mounting frame 26 to the vehicle seat base 34, and the positions of the first and second seat attachment projections 36, 38 with respect to the accessory fastener 40 are adjustable. This adjustability allows the mounting frame 26 to be easily attached to a wide variety of vehicle seat bases 34 having different anchor point configurations. The accessory mounting frame 26 can easily clamp into place when the vehicle seat 16 is removed. Once installed, the accessory mounting frame 26 can provide a universal or semi-universal fitting for several different vehicle accessories 18.

The first seat attachment projection 36 is an elongate bar in this embodiment that has a first bearing surface 42 that is configured to bear against a first portion 44 of the vehicle seat base 34. The first seat attachment projection 36 also has a first opposite bearing surface 46 that is configured to bear against a first opposite portion 48 of the vehicle seat base 34. The first bearing surface 42 and the first opposite bearing surface 46 are located on opposite ends of the first seat attachment projection 36. Similarly, the second seat attachment projection 38 is an elongate bar in this embodiment that has a second bearing surface 50 that is configured to bear against a second portion 52 of the vehicle seat base 34. The second seat attachment projection 38 also has a second opposite bearing surface 54 that is configured to bear against a second opposite portion 56 of the vehicle seat base 34. The second bearing surface 50 and the second opposite bearing surface 54 are located on opposite ends of the second seat attachment projection 38. The elongate bar structure of the first seat attachment projection 36 and the second seat attachment projection 38 allows for the mounting plate 26 to be situated closer to the vehicle seat base 34. This arrangement can impart additional structural rigidity to the overall assembly. However, it is possible for the seat attachment projections 36, 38 of the mounting plate 26 to have different profile shapes than what is particularly illustrated herein. The structure of the seat attachment projections 36, 38 may be at least partially dictated by the structure of the seat base 34. In the illustrated embodiment, the anchor points or portions 44, 48, 52, 56 of the seat base 34 are headed cylindrical posts or screws, and thus, having a partially curved or concave attachment projection 36, 38 can help provide an improved fit and connection.

In the illustrated embodiment, the first seat attachment projection 36 and the second seat attachment projection 38 are symmetrically arranged with respect to the accessory fastener 40. As illustrated in FIG. 4, the accessory mounting frame 26 is symmetrical with respect to both the X-axis and the Y-axis, which originate at the center point of the frame or rotatable attachment 58 of the attachment projections 36, 38 with respect to the fastener 40. In some embodiments where the vehicle seat base 34 is not symmetrical, the accessory mounting frame 26 may adapt to the configuration of the non-symmetrical anchor points 44, 48, 52, 56. Additionally, the vehicle seat base 34 may have more or less anchor points than illustrated, and the accessory mounting frame 26 may couple with less anchor points or possible more anchor points, as needed.

The first seat attachment projection 36 and the second seat attachment projection 38 form an "X" shape having four prongs 60, 62, 64, 66 which extend from the corners 68, 70, 72, 74 of the accessory fastener 40 (the prongs 60-66 are labeled in FIG. 4 and the corners 68-74 are labeled in FIG. 3 for clarity purposes). In some embodiments, instead of having two bars for the projections 36, 38, it may be possible to have four or more prongs 60-66 that are separate from each other instead of two bars mounted in the crisscross "X" shape as shown. Other configurations for the attachment projections 36, 38 are certainly possible.

As labeled in FIG. 4, each of the bearing surfaces 42, 46, 50, 54 are at least partially created by a cam-shaped extremity 76 at each respective end of the first and second attachment projections 36, 38. The cam-shaped extremity 76 helps to create a concave profile 78 at each of the bearing surfaces 42, 46, 50, 54. The concave profile 78 provides landing zone for the anchor points or portions 44, 48, 52, 56 of the vehicle seat base 34 to which the mounting plate 26 is coupled to. The concave profile 78 can at least partially define a vehicle seat attachment range, which is schematically illustrated in FIG. 4, where alternative anchor point locations 80, 82, 84, 86 illustrate a configuration for a larger seat base 34. Thus, in this example, the mounting plate 26 is attachable to a smaller seat base at bolts or anchor points 44, 48, 52, 56. The mounting plate 26 is also attachable to a larger seat base at the alternative anchor point locations 80, 82, 84, 86 (as well as any size between this range). Thus, the vehicle seat attachment range (between X1, Y1 and X2, Y2, inclusive) may be at least partially defined by the shape of the concave profile 78 at each of the bearing surfaces 42, 46, 50, 54. In one particular embodiment, X1 is 415 mm, X2 is 480 mm, Y1 is 365 mm, and Y2 is 415 mm. Thus, the vehicle seat attachment range spans about 65 mm in the X direction and about 50 mm in the Y direction. Other vehicle seat attachment ranges may be achieved depending on the desired implementation.

The first and second seat attachment projections 36, 38 are rotatably mounted at the center point 58 of the accessory fastener 40. As illustrated, the projections 36, 38 are spring biased towards each other by longitudinal springs 88, 90. This arrangement is conveniently spring-loaded to provide for automatic clamping of the mounting frame 26 to the anchor points 44, 48, 52, 56. The springs 88, 90 are mounted to pull the respective bearing surfaces 42, 46 of the first attachment projection 36 toward the respective bearing surfaces 54, 50 of the second attachment projection 38. This permits the mounting frame 26 to be clamped to the anchor points 44, 48, 52, 56 in a location underneath enlarged heads of the anchor points that are shown in FIG. 4. In this way the mounting frame 26 can be securely fixed in place in the longitudinal and lateral (X, Y) directions of the vehicle by the force of the springs 88, 90 acting to bias the bearing surfaces 42, 46, 50, 54 against the respective anchor points 44, 48, 52, 56, and in the vertical (Z) direction by retention of the attachment projections between the vehicle floor (or seat base) and the underside of the enlarged heads of the anchor points. Other mechanisms may be used to bias the attachment projections 36, 38 against the anchor points 44, 48, 52, 56, such as a steel spring in the pivot or center point 58, a lead screw connecting both projections 36, 38, or a rachet mechanism located at the pivot or center point 58, to cite a few examples.

The accessory fastener 40 creates the interface 32 between the clamped anchor points 44, 48, 42, 56 and the vehicle accessory 18. In the illustrated embodiment, the accessory fastener comprises an adapter plate 92 having a plurality of locating holes 94, 96, 98, 100. Advantageously, the locating holes 94, 96, 98, 100 are located along each of the X and Y axes near the four outer edges of the adapter plate 92. This arrangement can provide more rotational clearance for each of the seat attachment projections 36, 38. This embodiment includes a more passive accessory fastening mechanism, as one or more of the locating holes 94, 96, 98, 100 can easily accommodate a screw or other fastener to attach the platform 20 and/or footrest 22. In some embodiments, one or more of the locating holes 94, 96, 98, 100 can receive a locking projection (e.g., a locking detent mechanism) of the vehicle accessory 18. The locating holes 94, 96, 98, 100 in other embodiments may comprise grooves that cooperate with latches of the vehicle accessory 18. In yet other embodiments, the accessory fastener 40 can include a more active fastening mechanism, such as a locking projection 102 (e.g., a locking detent mechanism) which can cooperate with locating holes on the vehicle accessory. Or, it may be possible for the locking projection 102 depress at the center point 58 when certain vehicle accessories are attached, such as the illustrated platform 20. In some embodiments, the accessory fastener 40 can have other configurations besides the illustrated adapter plate 92. For example, the accessory fastener may have only a single locking projection, a pronged attachment structure, or some other operable fastening mechanism.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C".

The invention claimed is:

1. An accessory mounting frame for a vehicle seat base, comprising:
    a first seat attachment projection having a first bearing surface and a first opposite bearing surface, wherein the first bearing surface is configured to bear against a first portion of the vehicle seat base, and wherein the first opposite bearing surface is configured to bear against a first opposite portion of the vehicle seat base;
    a second seat attachment projection having a second bearing surface, wherein the second bearing surface is configured to bear against a second portion of the vehicle seat base; and
    an accessory fastener coupled to the first seat attachment projection and the second seat attachment projection, wherein the first seat attachment projection and the second seat attachment projection are adjustable with respect to the accessory fastener.

2. The accessory mounting frame of claim 1, wherein at least a portion of each of the first bearing surface and the second bearing surface is created by a cam-shaped extremity.

3. The accessory mounting frame of claim 2, wherein the first bearing surface and the second bearing surface have a concave profile.

4. The accessory mounting frame of claim 3, wherein the concave profile of each of the first bearing surface and the second bearing surface at least partially defines a vehicle seat attachment range.

5. The accessory mounting frame of claim 1, wherein the second seat attachment projection has a second opposite bearing surface, wherein the second opposite bearing surface is configured to bear against a second opposite portion of the vehicle seat base.

6. The accessory mounting frame of claim 5, wherein the first seat attachment projection and the second seat attachment projection are symmetrically arranged with respect to the accessory fastener.

7. The accessory mounting frame of claim 6, wherein the first seat attachment projection and the second seat attachment projection form an "X" shape having four prongs.

8. The accessory mounting frame of claim 7, wherein the four prongs extend from corners of an adapter plate of the accessory fastener.

9. The accessory mounting frame of claim 1, wherein a plurality of springs is used to bias the first seat attachment toward the second seat attachment projection.

10. The accessory mounting frame of claim 9, wherein the plurality of springs is configured to clamp the first seat attachment projection and the second seat attachment projection to the first portion of the vehicle seat base and the second portion of the vehicle seat base.

11. The accessory mounting frame of claim 1, wherein the first seat attachment projection and the second seat attachment projection are rotatably mounted with respect to the accessory fastener.

12. The accessory mounting frame of claim 1, wherein the accessory fastener comprises an adapter plate having one or more locating holes.

13. The accessory mounting frame of claim 1, wherein the accessory fastener comprises one or more locking projections.

14. A vehicle, comprising:
an interior passenger cabin;
a vehicle accessory; and
the accessory mounting frame of claim 1, wherein the first bearing surface bears against the first portion of the vehicle seat base and the second bearing surface bears against the second portion of the vehicle seat base, and wherein the vehicle accessory is installed within the vehicle interior passenger cabin via the accessory fastener of the accessory mounting frame.

15. An accessory mounting frame for a vehicle seat base, comprising:
a first seat attachment projection having a first bearing surface, wherein the first bearing surface is configured to bear against a first portion of the vehicle seat base;
a second seat attachment projection having a second bearing surface, wherein the second bearing surface is configured to bear against a second portion of the vehicle seat base, and wherein at least a portion of each of the first bearing surface and the second bearing surface is created by a cam-shaped extremity; and
an accessory fastener, wherein the accessory fastener is directly coupled to the first seat attachment projection and the accessory fastener is directly coupled to the second seat attachment projection, wherein the first seat attachment projection and the second seat attachment projection are adjustable with respect to the accessory fastener.

* * * * *